United States Patent
Kim et al.

(10) Patent No.: US 9,425,881 B2
(45) Date of Patent: Aug. 23, 2016

(54) METHOD AND DEVICE FOR TRANSMITTING CHANNEL STATE INFORMATION IN A WIRELESS COMMUNICATION SYSTEM

(75) Inventors: Hyungtae Kim, Anyang-si (KR); Hanbyul Seo, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 14/005,764

(22) PCT Filed: May 4, 2012

(86) PCT No.: PCT/KR2012/003517
§ 371 (c)(1),
(2), (4) Date: Sep. 17, 2013

(87) PCT Pub. No.: WO2012/157876
PCT Pub. Date: Nov. 22, 2012

(65) Prior Publication Data
US 2014/0348075 A1    Nov. 27, 2014

Related U.S. Application Data

(60) Provisional application No. 61/485,628, filed on May 13, 2011.

(51) Int. Cl.
*H04B 7/06* (2006.01)
(52) U.S. Cl.
CPC ............ *H04B 7/0626* (2013.01); *H04B 7/0639* (2013.01)
(58) Field of Classification Search
None
See application file for complete search history.

(56) References Cited

U.S. PATENT DOCUMENTS

| 2010/0035600 | A1* | 2/2010 | Hou | H04B 7/024 455/422.1 |
|---|---|---|---|---|
| 2010/0067480 | A1* | 3/2010 | Wang | H04B 7/0413 370/330 |
| 2010/0103832 | A1* | 4/2010 | Zhou | H04B 7/0417 370/252 |
| 2010/0105404 | A1* | 4/2010 | Palanki | H04L 1/0025 455/450 |
| 2010/0238984 | A1* | 9/2010 | Sayana | H04B 7/0634 375/219 |
| 2010/0246457 | A1 | 9/2010 | Zhou et al. | |
| 2010/0322351 | A1* | 12/2010 | Tang | H04B 7/024 375/316 |

(Continued)

FOREIGN PATENT DOCUMENTS

| KR | 10-2010-0109511 A | 10/2010 |
|---|---|---|
| KR | 10-2010-0130846 A | 12/2010 |

(Continued)

*Primary Examiner* — Ajay Cattungal
(74) *Attorney, Agent, or Firm* — Birch, Stewart, Kolasch & Birch, LLP

(57) ABSTRACT

The present invention relates to a wireless communication system. A method for a terminal to transmit channel state information (CSI) comprises the steps of: determining a precoding matrix by selecting a first precoding matrix and a second precoding matrix; and transmitting the CSI including an index of the said first precoding matrix and an index of the said second precoding matrix. The said first precoding matrix relates to a method for transmitting CSI in which a revision factor according to a relationship between the said terminal and a transmission point is applied.

12 Claims, 13 Drawing Sheets

(56) References Cited

U.S. PATENT DOCUMENTS

| | | | |
|---|---|---|---|
| 2011/0252139 A1* | 10/2011 | Bhattad | H04L 1/0013 709/226 |
| 2012/0039272 A1* | 2/2012 | Lee | H04W 72/04 370/329 |
| 2012/0052901 A1* | 3/2012 | Zhu | H04L 1/0029 455/517 |
| 2012/0087425 A1* | 4/2012 | Gomadam | H04B 7/0417 375/260 |
| 2012/0088514 A1 | 4/2012 | Lee et al. | |
| 2012/0114028 A1* | 5/2012 | Davydov | H04B 7/024 375/224 |
| 2013/0003788 A1* | 1/2013 | Marinier | H04B 7/024 375/219 |
| 2013/0155942 A1* | 6/2013 | Lee | H04L 1/1858 370/315 |
| 2013/0294275 A1* | 11/2013 | Gorokhov | H04B 7/024 370/252 |
| 2013/0294332 A1* | 11/2013 | Kim | H04L 5/0048 370/315 |
| 2013/0315184 A1* | 11/2013 | Kim | H04W 72/0406 370/329 |
| 2013/0315189 A1* | 11/2013 | Kim | H04L 1/0026 370/329 |

FOREIGN PATENT DOCUMENTS

| | | |
|---|---|---|
| WO | WO 2010/048513 A2 | 4/2010 |
| WO | WO 2011/041930 A1 | 4/2011 |
| WO | WO 2011/053996 A1 | 5/2011 |

\* cited by examiner

FIG. 5
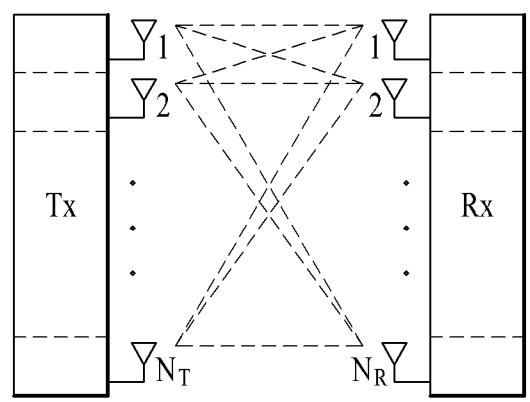
(a)
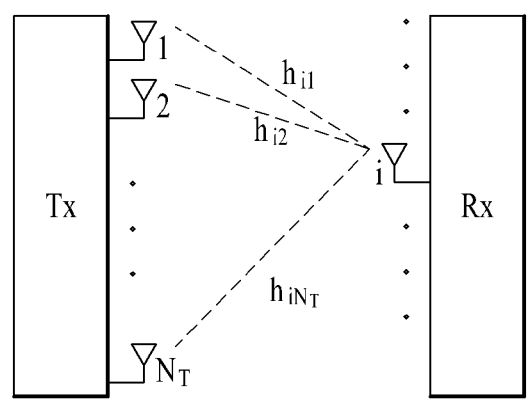
(b)

METHOD AND DEVICE FOR TRANSMITTING CHANNEL STATE INFORMATION IN A WIRELESS COMMUNICATION SYSTEM

TECHNICAL FIELD

The present invention relates to a wireless communication system and, more specifically, to a method and device for transmitting channel state information.

BACKGROUND ART

Multiple Input Multiple Output (MIMO) increases the efficiency of data transmission and reception using multiple transmit antennas and multiple receive antennas. A receiver receives data through multiple paths when multiple antennas are used, whereas the receiver receives data through a single antenna path when a single antenna is used. Accordingly, MIMO can increase data transmission rate and throughput while also improving coverage.

To increase multiplexing gain of MIMO, channel status information (CSI) can be fed back from a MIMO receiver to be used at a MIMO transmitter. The receiver can determine the CSI by performing channel measurement using a predetermined reference signal (RS) from the transmitter.

DISCLOSURE

Technical Problem

An object of the present invention devised to solve the problem lies in a method for transmitting channel state information using a hierarchical codebook that can correctly reflect a communication environment of a terminal and a transmission point.

The technical problems solved by the present invention are not limited to the above technical problems and those skilled in the art may understand other technical problems from the following description.

Technical Solution

According to a first aspect of the present invention, a method for enabling a UE to transmit channel state information (CSI) in a wireless communication system includes: determining a precoding matrix by selecting a first precoding matrix and a second precoding matrix; and transmitting CSI including an index of the first precoding matrix and an index of the second precoding matrix, wherein the first precoding matrix is a precoding matrix to which a revision factor based on the relationship between the UE and a transmission point has been applied.

According to a second aspect of the present invention, a method for enabling a transmission point to transmit a downlink signal in a wireless communication system includes: determining a precoding matrix by selecting a first precoding matrix and a second precoding matrix; and precoding a downlink signal using the precoding matrix, wherein the first precoding matrix is a precoding matrix to which a revision factor based on the relationship between a UE receiving the downlink signal and the transmission point has been applied.

According to a third aspect of the present invention, a UE in a wireless communication system includes: a reception module; and a processor, wherein the processor determines a precoding matrix by selecting a first precoding matrix and a second precoding matrix and transmits CSI including an index of the first precoding matrix and an index of the second precoding matrix, wherein the first precoding matrix is a precoding matrix to which a revision factor based on the relationship between the UE and a transmission point has been applied.

According to a fourth aspect of the present invention, a transmission point in a wireless communication system includes: a transmission module; and a processor, wherein the processor determines a precoding matrix by selecting a first precoding matrix and a second precoding matrix and precodes a downlink signal using the precoding matrix, wherein the first precoding matrix is a precoding matrix to which a revision factor based on the relationship between a UE receiving the downlink signal and the transmission point has been applied The first to fourth aspect of the present invention may include the following.

The first precoding matrix may be selected from a first codebook in which long term wideband channel characteristics of the UE and the transmission point have been reflected and the second precoding matrix may be selected from a second codebook in which short term subband channel characteristics of the UE and the transmission point have been reflected.

The relationship between the UE and the transmission point may indicate that the UE receives downlink signals from two or more transmission points having the same cell ID.

The revision factor may be UE-specific.

The revision factor may be a value for revising a difference between channel states of the two or more transmission points.

An i-th first precoding matrix W1(i) selected from the first codebook and a j-th second precoding matrix W2(j) selected from the second codebook may be defined by $$W1(i) = \begin{bmatrix} X_i & 0 \\ 0 & \rho X_i \end{bmatrix}$$

$$W2(j) = \begin{bmatrix} e_M^k & e_M^l & e_M^m \\ & \cdots & \\ \alpha_j e_M^k & \beta_j e_M^l & \gamma_j e_M^m \end{bmatrix}$$

wherein W1(i) is an Nt×2M matrix, $X_i$ is an (Nt/2)×M matrix, Nt is the number of transmission antennas of the transmission point, $\rho$ is the revision factor, W2(j) is a 2M×r matrix, r is the number of layers, $e_M^p$ (p=k, l, . . . , n) is an M×1 vector in which a p-th element is 1 and other elements are 0, $\alpha_j$, $\beta_j$ and $\gamma_j$ are phase values, 1≤k, l, n≤M, and k, l and n are integers.

Advantageous Effects

According to the present invention, it is possible to correctly reflect a channel state according to a communication environment of a terminal and a transmission point to enable more accurate channel state information feedback.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a configuration of a wireless communication system having multiple antennas.

BEST MODE

Figure 1:
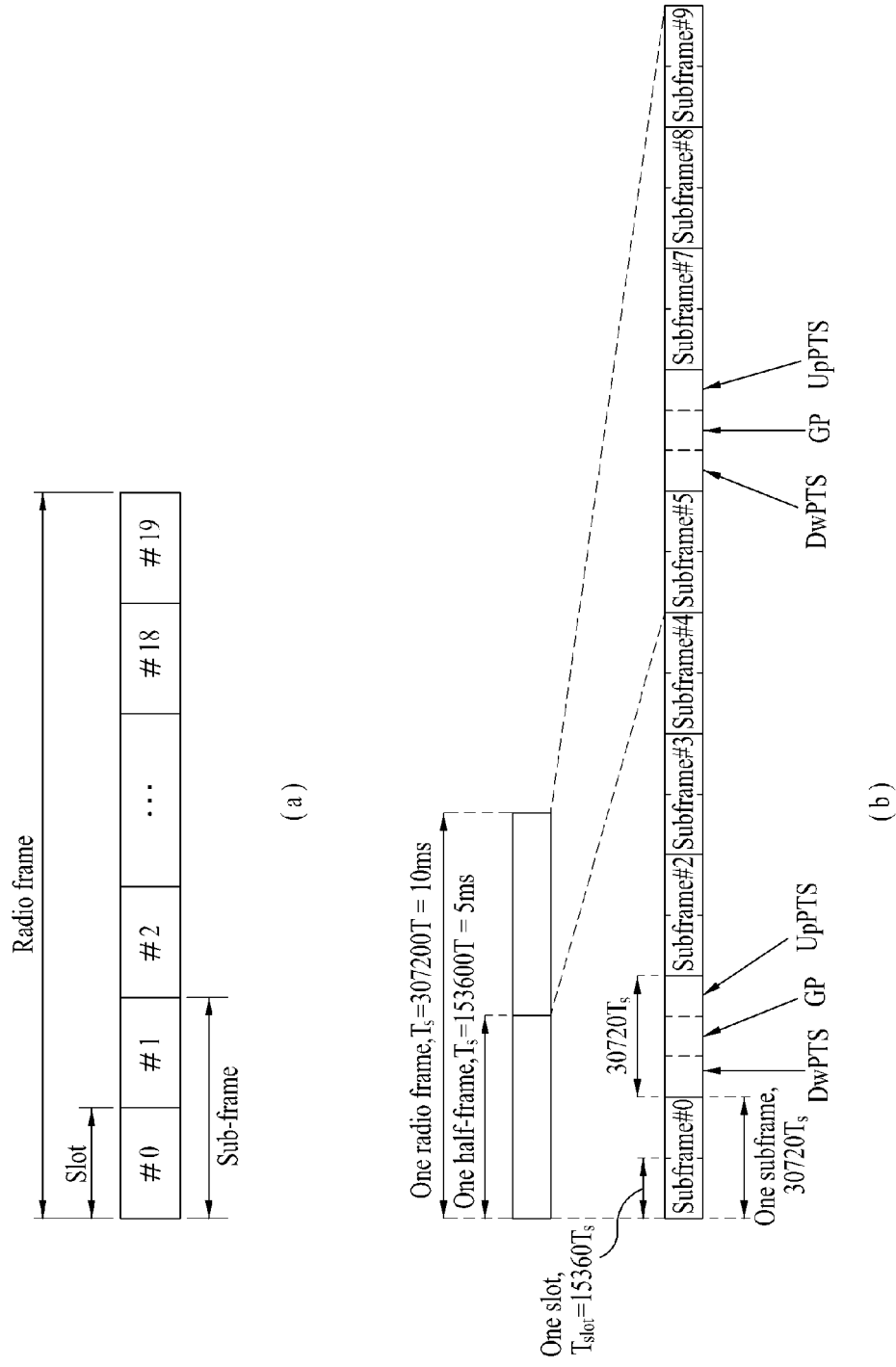
FIG. 1 illustrates a radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
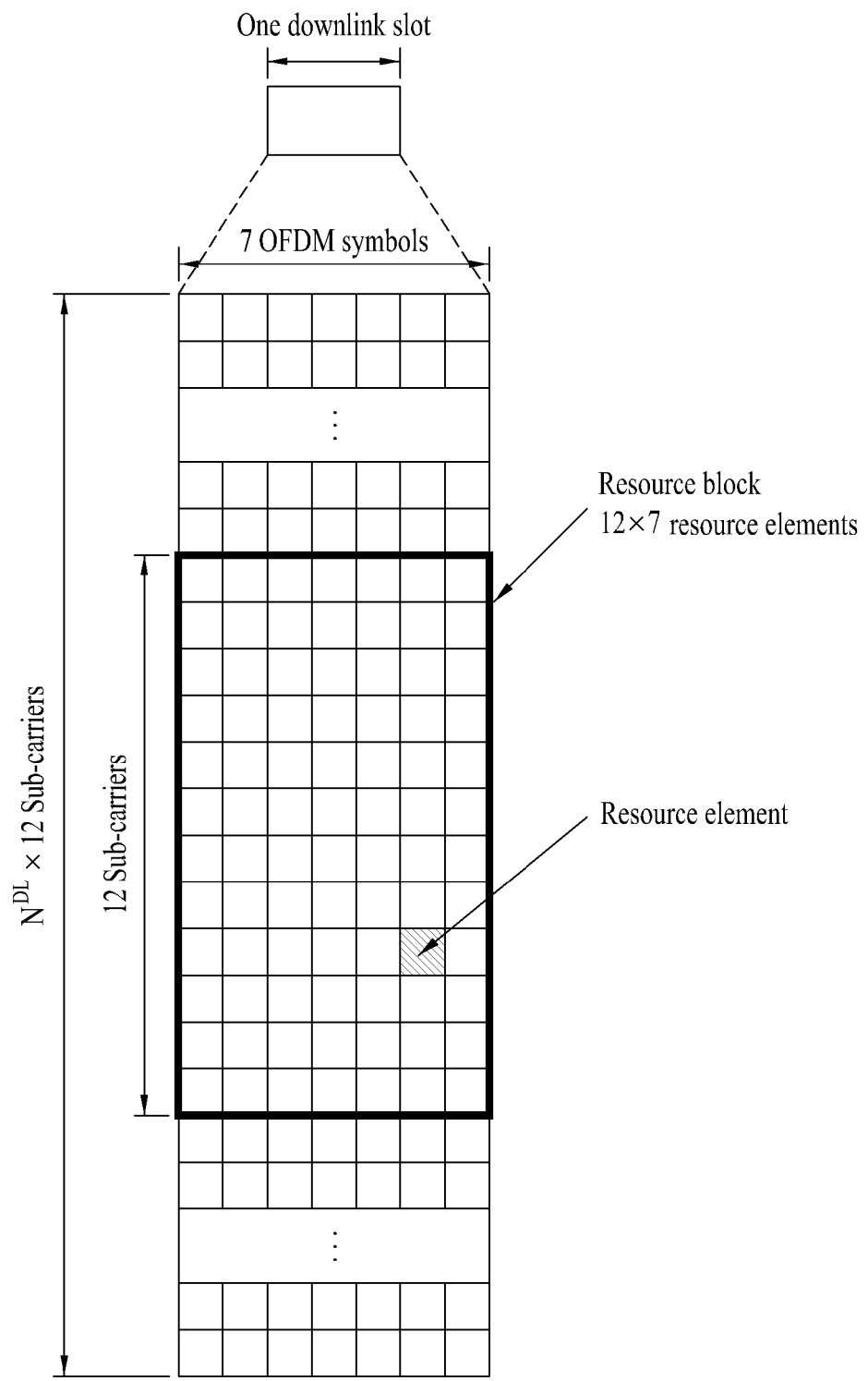
FIG. 2 illustrates a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
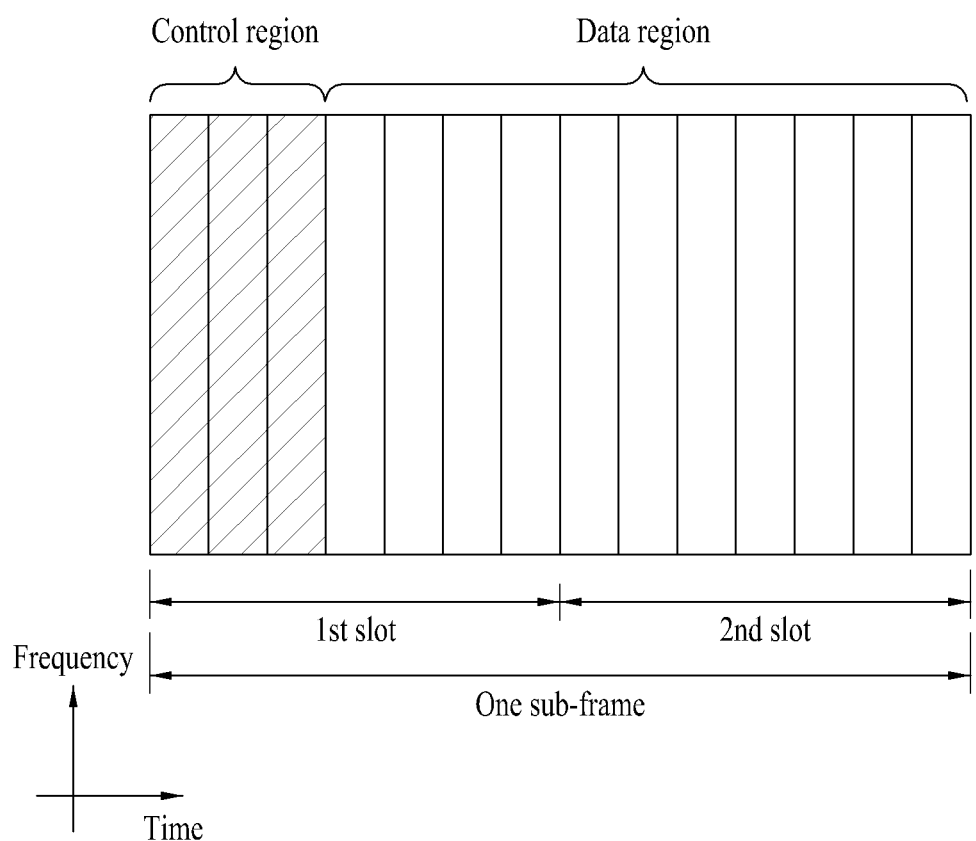
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
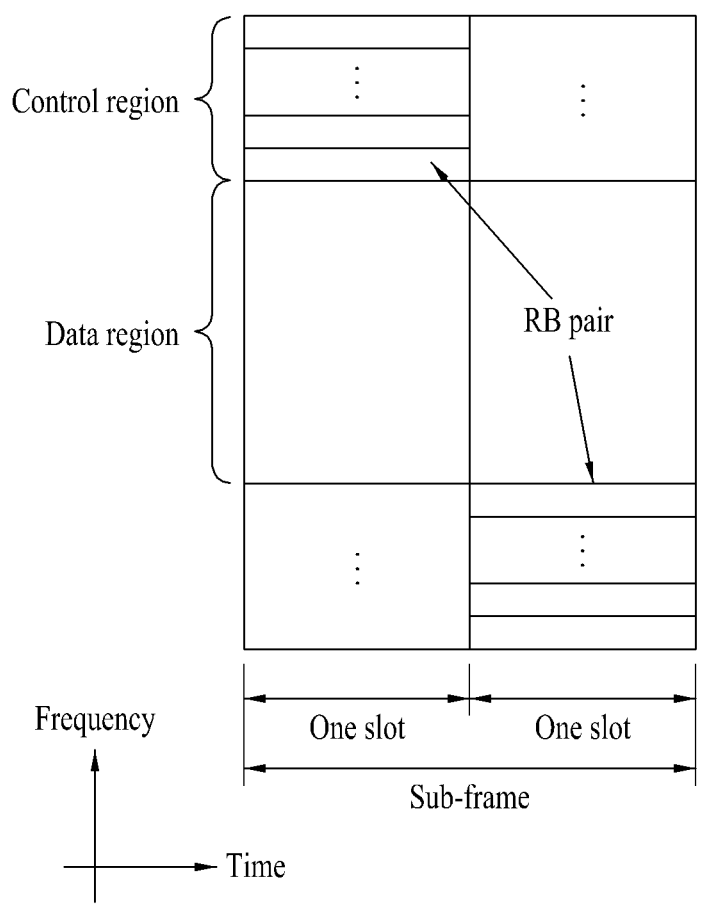
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$S = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ 0 & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{11} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & & \ddots \\ w_{N_T1} & w_{N_T2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs \qquad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix}$$

$$= \begin{bmatrix} h_{11} & h_{11} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n \qquad \text{[Equation 10]}$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R) \qquad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Heterogeneous Deployments

Figure 6:
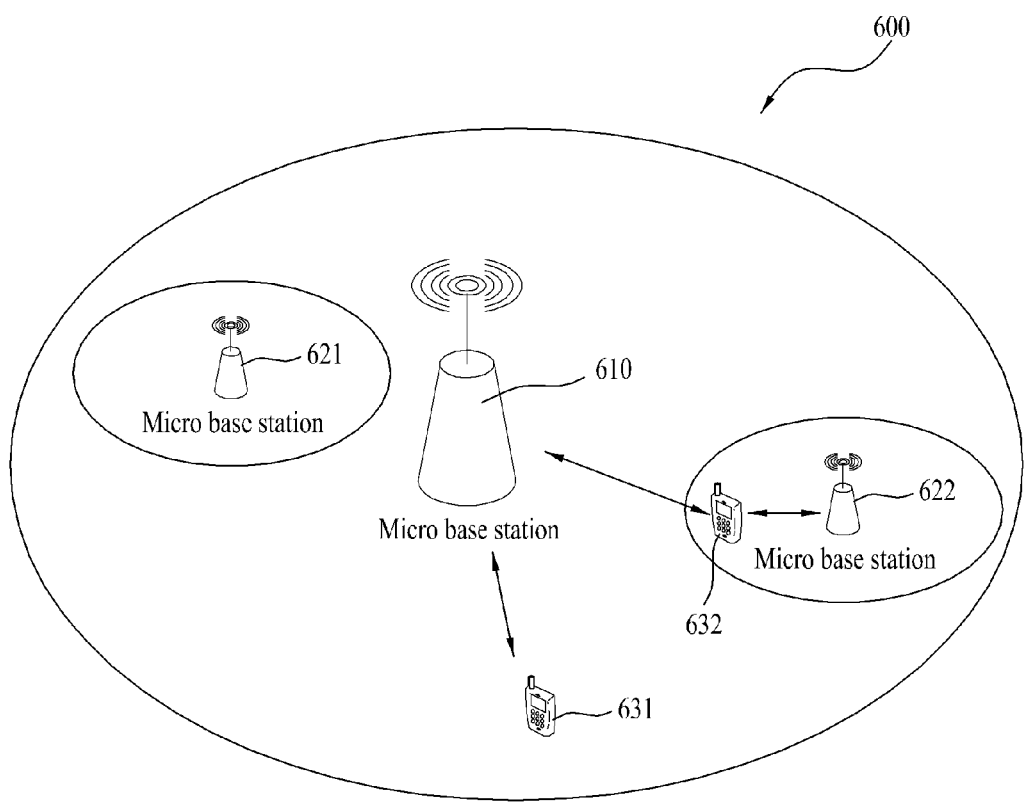
FIG. 6 illustrates a heterogeneous network.

FIG. 6 illustrates a heterogeneous network wireless communication system 600 including a macro base station (BS) and micro BSs. In the specification, a heterogeneous network refers to a network in which a macro BS 610 and micro BSs 621 and 622 coexist even when the BSs use the same radio access technology (RAT).

The macro BS 610 refers to a general BS of a wireless communication system, which has wide coverage and high transmission power. The macro BS 610 may be called a macro cell.

The micro BSs 621 and 622 may be calls micro cells, pico cells, femto cells, home eNBs (HeNBs) or the like (the micro BSs and macro BS may be commonly called transmission points). The micro BSs 621 and 622, a small version of the macro BS 610, can be independently operated while performing most of functions of the macro BS and overlaid in the coverage of the macro BS or installed in a shadow area that cannot be covered by the macro BS. The micro BSs 621 and 622 have a small coverage and low transmission power lower and accept a small number of terminals, compared to the macro BS 610.

A terminal (referred to as a macro-UE hereinafter) 631 may be directly served by the macro BS 610 and a terminal (referred to as a micro-UE hereinafter) 632 may be served by the micro BS 622. The micro-UE 632 present in the coverage of the micro BS 622 may be served by the macro BS 610.

Micro BSs can be categorized into two types according to whether terminal access is limited or not. The first type is a closed subscriber group (CSG) micro BS and the second type is an open access (OA) or open subscriber group (OSG) micro BS. The CSG micro BS can serve permitted specific UEs only and the OSG micro BS can serve any UE without access restriction.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Carrier Aggregation

Figure 7:
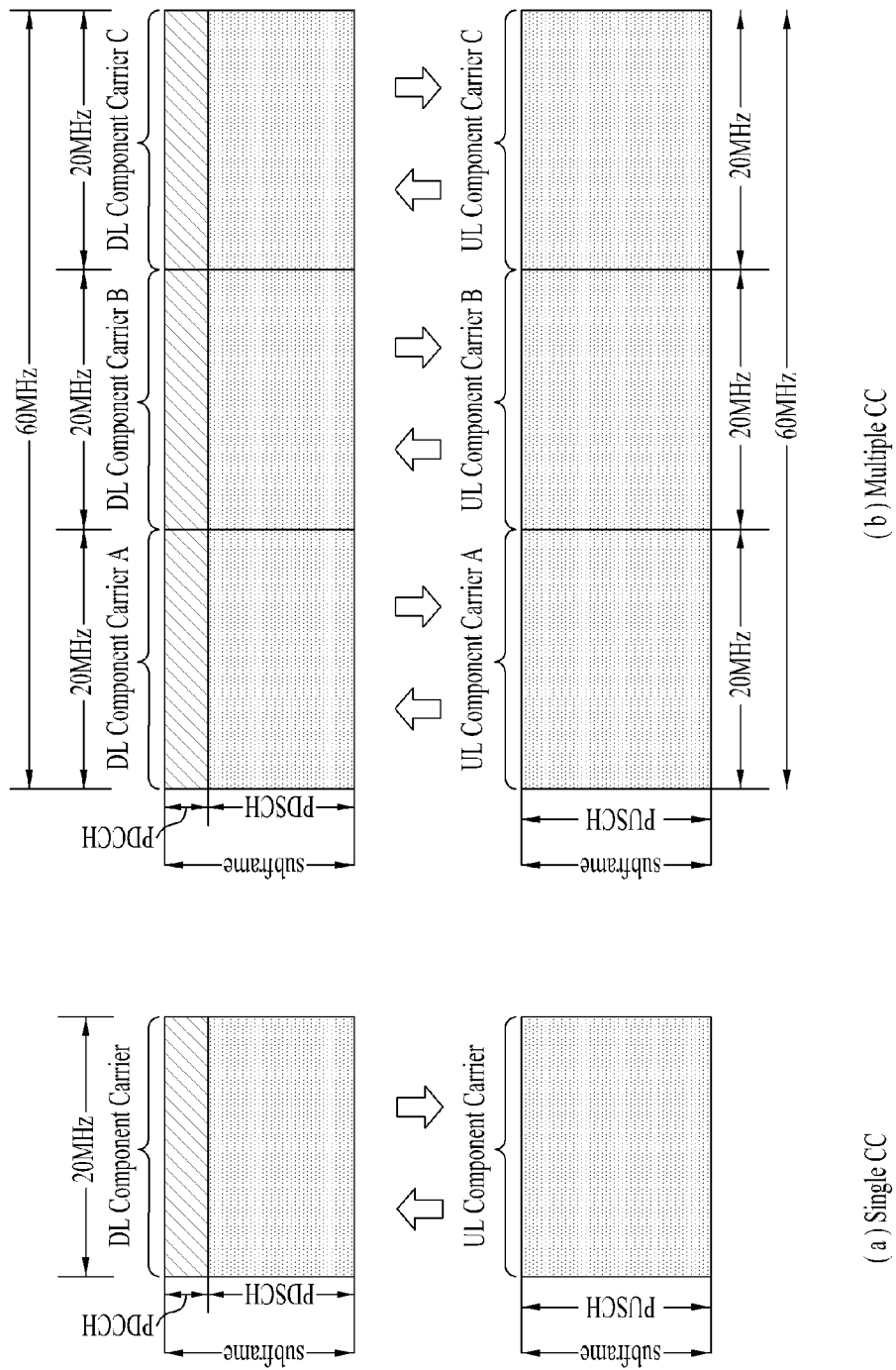
FIG. 7 illustrates carrier aggregation.

FIG. 7 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A DL CC and a UL CC may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 7. CA is a technology introduced to use a wider band to meet demands for a high transmission rate. CA can be defined as aggregation of two or more component carriers (CCs) having different carrier frequencies. FIG. 7(a) shows a subframe when a conventional LTE system uses a single CC and FIG. 7(b) shows a subframe when CA is used. In FIG. 7(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 8:
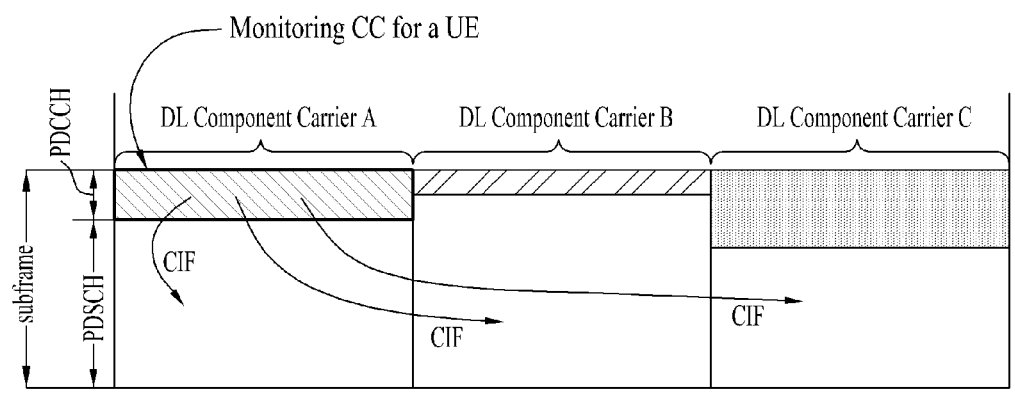
FIG. 8 illustrates cross carrier scheduling.

FIG. 8 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 8, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 8, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above-mentioned ACK/NACK bundling or multiplexing when the number of ACK/NACK bits to be transmitted is greater than the number of ACK/NACK bits that can be supported by ACK/NACK bundling or multiplexing.

Downlink Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

A new CSI feedback scheme that improves CSI composed of the RI, PMI and CQI can be applied in order to measure and report more accurate CSI. For example, precoding information fed back by a receiver can be indicated by a combination of two PMIs. One (first PMI) of the two PMIs is long term and/or wideband information and may be denoted as W1. The other PMI (second PMI) is short term and/or subband information and may be denoted as W1. A final PMI can be determined by a combination (or function) of W1 and W2. For example, if the final PMI is W, W can be defined as W=W1*W2 or W=W2*W1.

Here, W1 reflects frequency and/or temporal average characteristics of a channel. In other words, W1 can be defined as CSI reflecting characteristics of a long-term channel in the time domain, characteristics of a wideband channel in the frequency domain or characteristics of a long-term and wideband channel. To simply represent these characteristics of W1, W1 is referred to as long term wideband CSI (or long term wideband PMI) in this specification.

W2 reflects instantaneous channel characteristics compared to W1. In other words, W2 can be defined as CSI reflecting characteristics of a short-term channel in the time domain, characteristics of a subband channel in the frequency domain or characteristics of a short-term and subband channel. To simply represent these characteristics of W2, W2 is referred to as short term subband CSI (or short term subband PMI) in this specification.

To determine a final precoding matrix W from two different pieces of information (e.g. W1 and W2) representing channel states, it is necessary to configure separate codebooks (i.e. a first codebook for W1 and a second codebook for W2) composed of precoding matrices representing the information. A codebook configured in this manner may be called a hierarchical codebook. Determination of a final codebook using the hierarchical codebook is called hierarchical codebook transformation.

A codebook can be transformed using a long-term covariance matrix of a channel, represented by Equation 12, as exemplary hierarchical codebook transformation.

$$W = \text{norm}(W1\,W2) \quad \text{[Equation 12]}$$

In Equation 12, W1 (long term wideband PMI) denotes an element (i.e. codeword) constituting a codebook (e.g. first codebook) generated to reflect long term wideband channel information. That is, W1 corresponds to a precoding matrix included in the first codebook that reflects the long term wideband channel information. W2 (short term subband PMI) represents a codeword constituting a codebook (e.g. second codebook) generated to reflect short term/subband channel information. That is, W2 corresponds to a precoding matrix included in the second codebook that reflects the short term subband channel information. W is a codeword of a transformed final codebook and norm (A) denotes a matrix in which the norm of each column of matrix A is normalized to 1.

W1 and W2 may have structures as represented by Equation 13.

$$W1(i) = \begin{bmatrix} X_i & 0 \\ 0 & X_i \end{bmatrix} \quad \text{[Equation 13]}$$

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r\,columns} \text{(if rank} = r)$$

In Equation 13, W1 can be defined as a block diagonal matrix and blocks correspond to the same matrix $X_i$. A block $X_i$ can be defined as a (Nt/2)×M matrix. Here, Nt denotes the number of Tx antennas. $e_M^p$ (p=k, l, . . . , m) is an M×1 vector wherein a p-th element of M vector elements represents 1 and other elements represent 0. When W1 is multiplied by $e_M^p$, a p-th column is selected from columns of W1 and thus this vector can be called a selection vector. The number of vectors fed back at a time to represent a long term wideband channel increases as M increases, to thereby improve feedback accuracy. However, the codebook size of W1 fed back with low frequency decreases and the codebook size of W2 fed back with high frequency increases as M increases, increasing feedback overhead. That is, there is a tradeoff between feedback overhead and feedback accuracy. Accordingly, M can be determined such that feedback overhead is not excessively increased and appropriate feedback accuracy is maintained. As to W2, $\alpha_j$, $\beta_j$ and $\gamma_j$ are predetermined phase values. In Equation 13, $1 \le k, l, m \le M$ and k, l and m are integers.

The codebook structure represented by Equation 13 uses a cross polarized antenna configuration and reflects correlation characteristics of a channel, generated when antenna spacing is narrow (when a distance between neighboring antennas is less than half a signal wavelength). For example, cross polarized antenna configurations may be represented as shown in Table 1.

TABLE 1

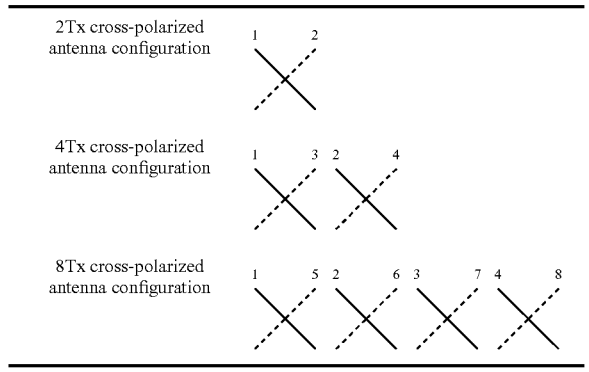

| 2Tx cross-polarized antenna configuration |
| 4Tx cross-polarized antenna configuration |
| 8Tx cross-polarized antenna configuration |

In Table 1, an 8Tx cross polarized antenna configuration is composed of two antenna groups having orthogonal polarizations. Antennas belonging to antenna group 1 (antennas 1, 2, 3 and 4) may have the same polarization (e.g. vertical polarization) and antennas belonging to antenna group 2 (antennas 5, 6 7 and 8) may have the same polarization (e.g. horizontal polarization). The two antenna groups are co-located. For example, antennas 1 and 5 can be co-located, antennas 2 and 6 can be co-located, antennas 3 and 7 can be co-located and antennas 4 and 8 can be co-located. In other words, antennas in an antenna group have the same polarization as in a uniform linear array (ULA) and a correlation between antennas in an antenna group has a linear phase increment characteristic. Furthermore, a correlation between antenna groups has a phase rotation characteristic.

Since a codebook is composed of values obtained by quantizing a channel, it is necessary to design the codebook by reflecting actual channel characteristics therein. To describe reflection of actual channel characteristics in codewords of a codebook designed as represented by Equation 13, a rank-1 codebook is exemplified. Equation 14 represents determination of a final codeword W by multiplying codeword W1 by codeword W2 in the case of rank 1.

$$W1(i) * W2(j) = \begin{bmatrix} X_i(k) \\ \alpha_j X_i(k) \end{bmatrix} \quad \text{[Equation 14]}$$

In Equation 14, the final codeword is represented by a vector of Nt×1 and is composed of an upper vector $X_i(k)$ and a lower vector $\alpha_j X_i(k)$ which respectively represent correlations between horizontal antenna groups and vertical antenna groups of cross polarized antennas. $X_i(k)$ is preferably represented as a vector (e.g. DFT matrix) having linear phase increment in which correlation between antennas in each antenna group is reflected.

As another example of hierarchical codebook transformation, the codebook can be transformed using a long term covariance matrix of a channel, as represented by Equation 15.

$$W1 = R$$
$$W = \text{norm}(W1 W2) \quad \text{[Equation 15]}$$

In Equation 15, W1 (long term wideband PMI) denotes an element (i.e. codeword) constituting a codebook (e.g. first codebook) generated to reflect long term wideband channel information. That is, W1 corresponds to a precoding matrix included in the first codebook reflecting long term wideband channel information. W2 (short term subband PMI) denotes a codeword constituting a codebook (e.g. second codebook) generated to reflect short term subband channel information. That is, W2 corresponds to a precoding matrix included in the second codebook reflecting short term subband channel information. In addition, W denotes a codeword of the transformed final codebook and norm (A) represents a matrix in which the norms of columns are normalized to 1. In Equation 15, it is assumed that W1 is represented as R corresponding to a long-term covariance matrix of channel H and R can be represented by Equation 16.

$$R = E[H^H H] \stackrel{(a)}{=} V \Lambda V^H = \sum_{i=1}^{Nt} \sigma_i v_i v_i^H \quad \text{[Equation 16]}$$

In Equation 16, $\stackrel{(a)}{=}$ represents that a result obtained through singular value decomposition of $E[H^H H]$ is $V \Lambda V^H$. In addition, $\sigma_i$ and $v_i$ respectively denote an i-th singular value and an i-th singular column vector corresponding to the i-th singular value. Here, $\sigma_1 \ge \sigma_2 \ge \ldots \ge \sigma_{Nt}$.

For example, when a single transmission stream is present, W2 is a Nt×1 vector and W can be represented by Equation 17.

$$W = \sum_{i=1}^{Nt} \sigma_i v_i (v_i^H W2) \quad \text{[Equation 17]}$$

In Equation 17, W is determined as a weighted linear combination of singular vectors. Here, a weighted factor of $v_i$ is determined as a product of the singular value $\sigma_i$ and a correlation $v_i^H W2$ between $v_i$ and codeword W2. Consequently, codewords W of the codebook are concentrated on a dominant singular vector having a large value of $\sigma_i$ and thus, more effective quantization can be achieved.

Figure 9:
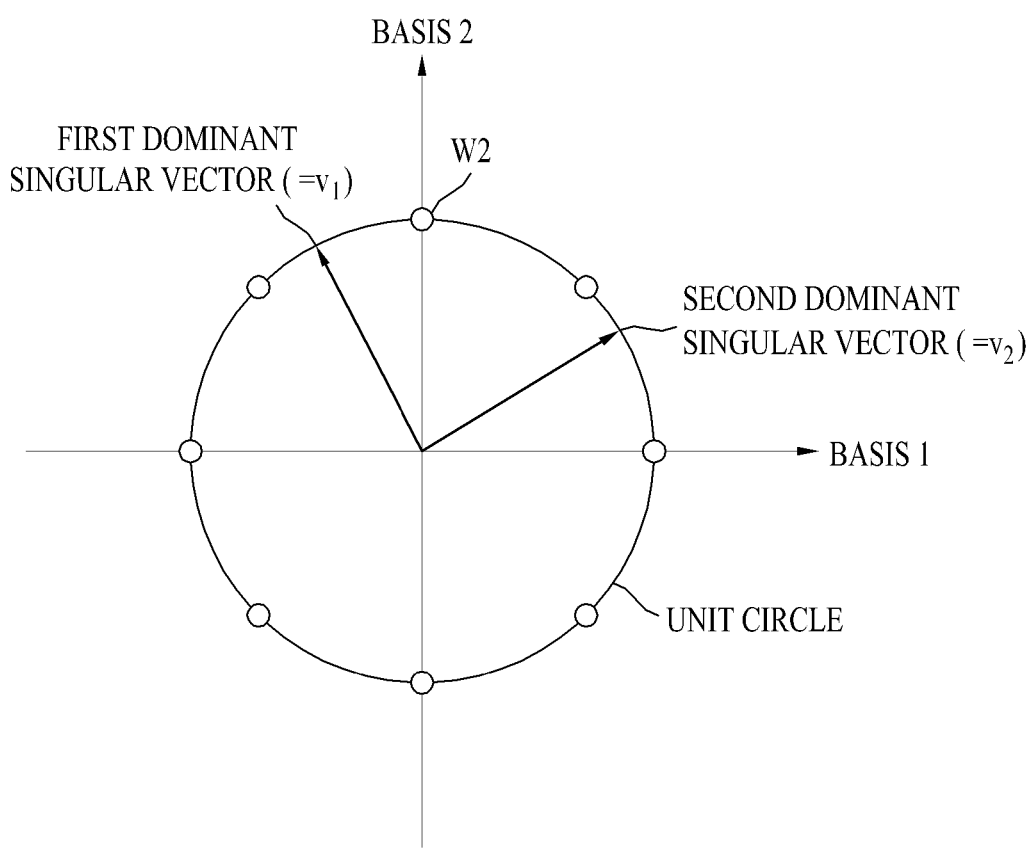
FIGS. 9 and 10 illustrate a hierarchical codebook.
Figure 10:
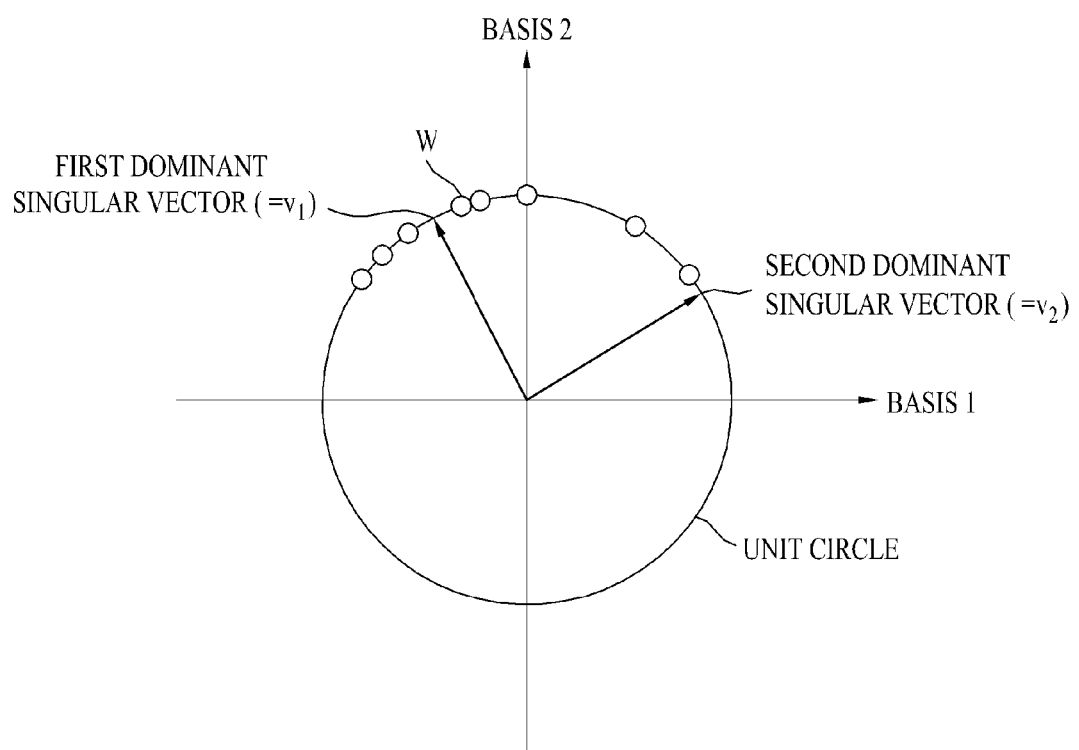

FIGS. 9 and 10 illustrate effective reflection of a channel state when hierarchical codebook transformation is applied. FIGS. 9 and 10 show a two-dimensional (2D) space on the assumption that Nt=2 (i.e. the number of transmission antennas is 2 (2Tx)). FIGS. 9 and 10 are exemplary and the present invention is not limited thereto. It is assumed that the 2D space is composed of basis 1 and basis 2 for convenience of description. FIG. 9 illustrates a case in which only one codebook (i.e. codebook W2) is used and FIG. 10 illustrates a case in which a codebook (i.e. codebook W) determined through hierarchical codebook transformation using two codebooks (i.e. codebooks W1 and W2) is used.

FIG. 9 shows singular vectors (a first dominant singular vector and a second dominant singular vector) present on the 2D space and W2 (i.e., codewords of codebook W2), the first dominant singular vector refers to a singular vector having a greater weight than that of the second dominant singular vector. While the codewords W2 may be distributed in a form different from FIG. 9, the example of FIG. 9 is based on the assumption that the codewords W2 are distributed such that a minimum distance between two codewords W2 is maximized in Gassmannian space in which channels are present (that is, the codewords W2 are distributed uniformly). Accordingly, codewords W2 (located on basis 1 of FIG. 9) closer to the first dominant singular vector from among codewords W2 that can be represented as the sum of the first and second dominant singular vectors can be determined. When the codebook designed in this manner is used, high performance can be achieved in the case of an uncorrelated channel, whereas performance is deteriorated in the case of a correlated channel. Since a correlation between a singular vector of instantaneous channel H and a singular vector of R is high, it is possible to achieve high performance by adaptively transforming the codebook according to R using the high correlation.

FIG. 10 shows singular vectors (a first dominant singular vector and a second dominant singular vector) present in the 2D space and W (i.e., codewords generated according to codebook transformation using codebooks W1 and W2). As shown in FIG. 10, a larger weight is applied to the first dominant singular vector of R, as described above, when codebook transformation is applied and thus new codewords can have a denser distribution based on the first dominant vector. That is, codewords that can correctly reflect an actual channel state can be selected.

When precoding is performed or CSI including PMIs is reported using a hierarchical codebook using codebooks W1 and W2, as described above, accuracy of fed back channel information can be improved. However, when W1 and W2 are respectively selected from codebooks, it may be difficult to sufficiently use the performance of W1 and W2 in an evolved communication environment. This is because various channel characteristics are present in an evolved communication environment and is difficult to represent all the various channel characteristics as a codebook. The evolved communication environment may correspond to a heterogeneous network environment or carrier aggregation.

In the case of a heterogeneous network environment, a downlink signal from a macro BS and a downlink signal from a micro BS may have asymmetrical channels due to a transmission power difference when the macro BS and the micro BS perform cooperative transmission for a UE. It is difficult to represent these asymmetrical channels as a codebook. In the case of carrier aggregation, when frequency bands of used component carriers are remarkably spaced apart from each other (e.g. when CC1 uses 700 MHz and CC2 uses 3.5 GHz), the component carriers may be subjected to different channels. Even in this case, it is inefficient to represent two component carriers using a codebook.

Therefore, the present invention proposes a method through which a transmission point and a UE select a codebook optimized for a communication environment from a plurality of codebooks present to represent channels between the transmission point and the UE and use the selected codebook. Here, information about codebook selection can be shared by the transmission point and the UE through higher layer signaling (e.g. RRC signaling).

Utilization of a hierarchical codebook in a heterogeneous network environment will be described first. The following description is based on the assumption that the heterogeneous network environment is composed of two transmission points and a UE, one of the two transmission points is a macro BS and the other is a micro BS. The macro BS and the micro BS have the same cell ID and cooperatively transmit a downlink signal to the UE. In this heterogeneous network environment, the UE and the transmission points can use a codebook obtained by revising the above-described hierarchical codebook. Specifically, a final precoding matrix can be determined by selecting a first precoding matrix W1 from a first codebook obtained by applying a revision factor that reflects the relationship between the transmission points and the UE to the above-described codebook representing long term wideband channel characteristics and selecting a second precoding matrix W2 from a second codebook in which short term subband channel characteristics have been applied. That is, a plurality of codebooks to which different revision factors reflecting the above-described codebook representing long term wideband channel characteristics and communication environment have been applied is prepared, the transmission points determine an appropriate codebook from among the plurality of codebooks and select the first precoding matrix W1.

The first precoding matrix W1 and the second precoding matrix W2 can be represented by Equation 18.

$$W1(i) = \begin{bmatrix} X_i & 0 \\ 0 & \rho X_i \end{bmatrix}$$

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix}$$

[Equation 18]

In Equation 18, W1 may be defined as a block diagonal matrix in which blocks correspond to the same matrix $X_i$. A block $X_i$ can be defined as a matrix having a size of (Nt/2)×M. Here, Nt denotes the number of transmission antennas. In Equation 18, $e_M^p$ (p=k, l, ..., m) of W2 is an M×1 vector in which a p-th element is 1 and other elements are 0. In W2, $\alpha_j$, $\beta_j$ and $\gamma_j$ respectively represent predetermined phase values. Here, 1≤k, l, m≤M and k, l and m are integers. ρ is a revision factor and may be a UE-specific value. Here, ρ may be set to a value smaller than 1 considering that the size of a channel received from the micro BS is smaller than the size of a channel received from the macro BS. ρ may be a fixed or variable and ρ can be shared by the transmission points and the UE when ρ is variable.

Operations of the transmission points and UE will now be described with reference to FIGS. 11 and 12 based on the above description.

Figure 11:
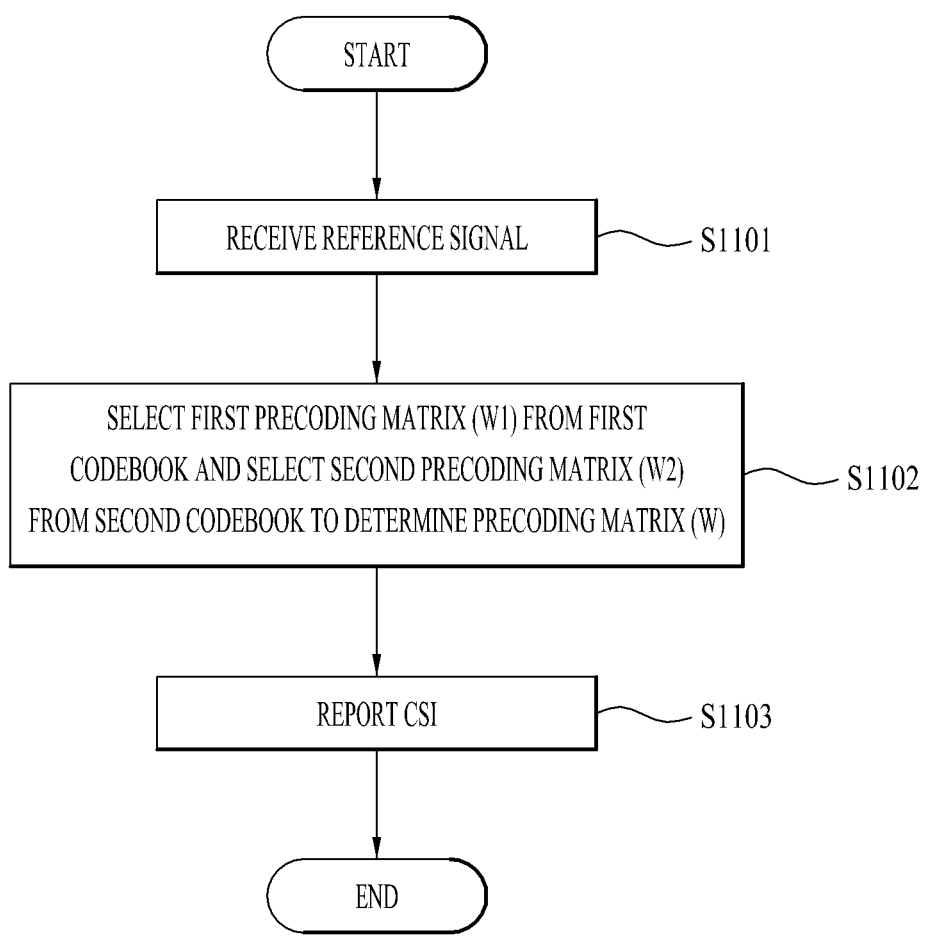
FIG. 11 is a flowchart illustrating an operation of a terminal when a hierarchical codebook according to an embodiment of the present invent is applied.

Referring to FIG. 11, the UE can receive reference signals from the transmission points (S1101). The reference signals may be CSI-RSs for supporting spatial multiplexing of eight layers introduced to LTE-A release 10. Furthermore, the reference signals may be respectively received from the transmission points, that is, the macro BS and the micro BS. Upon reception of the reference signals, the UE can respectively select the first and second precoding matrices W1 and W2 from the first and second codebooks determined by the transmission points (S1102). The first precoding matrix selected from the first codebook reflects the above-described long term wideband channel characteristics and is a precoding matrix to which the revision ρ factor reflecting the communication environment to which the UE belongs has been applied.

The UE can generate CSI including PMIs composed of an index of the first precoding matrix and an index of the second precoding matrix and transmit the CSI to the transmission point (S1103). Here, the CSI can be transmitted on a PUSCH in case of aperiodic CSI reporting and transmitted on a PUCCH in case of periodic CSI reporting at the request of the transmission points.

Figure 12:
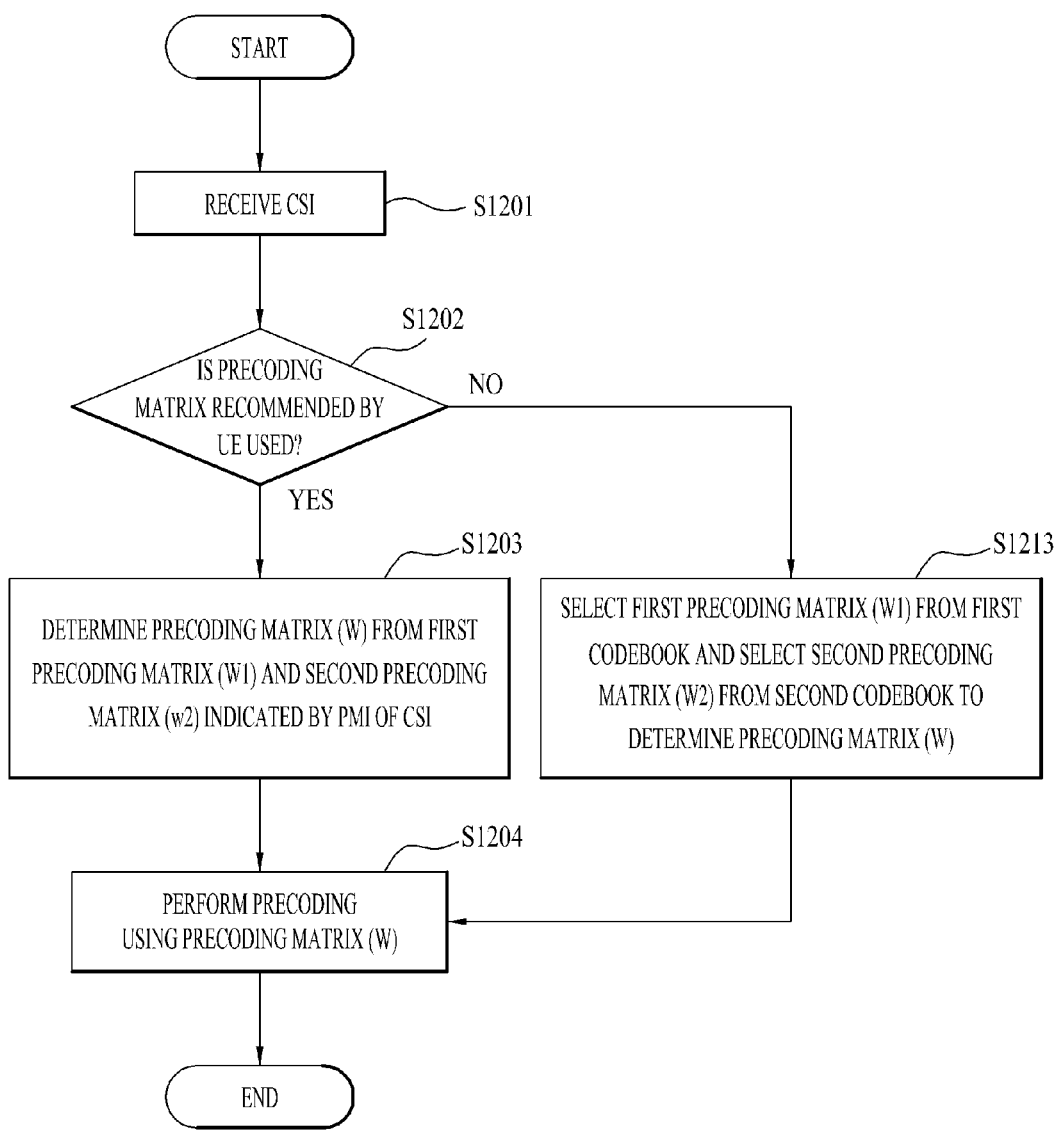
FIG. 12 is a flowchart illustrating an operation of a transmission point when the hierarchical codebook according to an embodiment of the present invent is applied.

Referring to FIG. 12, the transmission points can receive a channel state report from the UE (S1201). As described above, the channel state report from the UE may be periodic or aperiodic.

The transmission points may select precoding matrices based on the PMIs included in the CSI reported by the UE or select precoding matrices without being based on the PMIs (S1202). When the precoding matrices are selected based on the PMIs from the UE, the transmission points can determine a precoding matrix from the index of the first precoding matrix and the index of the second precoding matrix (S1203) and perform precoding using the determined precoding matrix (S1204). In this case, the transmission points can signal use of the precoding matrix based on the PMIs transmitted from the UE through downlink scheduling allocation DCI.

If a precoding matrix that does not correspond to the PMIs from the UE is selected, the transmission points can perform precoding using a precoding matrix, which is determined by selecting the first and second precoding matrices (S1213), (S1204). In this case, the transmission points need to explicitly signal the determined precoding matrix to the UE.

It is noted that the first codebook from which the first precoding matrix is selected is a codebook to which the revision factor ρ has been applied.

Another example to which a hierarchical codebook is applied may be a communication environment to which carrier aggregation is applied. As described above, component carriers may have different channel states and thus a codebook optimized per component carrier can be used. That is, different first codebooks representing long term wideband channel characteristics can be used for respective component carriers. Furthermore, when component carriers scheduled by the transmission points correspond to CC1 and CC2 corresponding to adjacent frequency bands and CC3 having a frequency band spaced apart from the frequency bands of CC1 and CC2, the same first codebook can be used for CC1 and CC2 and a first codebook different from the first codebook for CC1 and CC2 can be used for CC3. That is, it is possible to group frequency bands of component carriers to be used when carrier aggregation is applied into a predetermined number of groups, allocate a first codebook representing long term wideband channel characteristics to each group and use the first codebook for the corresponding component carrier.

In addition, when the above-described examples are combined, that is, when carrier aggregation is used in a heterogeneous network environment, one of a codebook W1a optimized for the heterogeneous network environment and codebooks W1b and W1c respectively optimized for a primary cell and a secondary cell may be selected as the first codebook. Alternatively, the first codebook may be selected from a plurality of codebooks designed to be optimized for component carriers and a revision factor reflecting channel characteristics of the heterogeneous network environment may be reflected.

While the first codebook in which long term wideband channel characteristics have been reflected in the case of heterogeneous network environment and carrier aggregation has been described above, the scope of the present invention is not limited thereto and the present invention can be applied to various communication environments. In addition, while the above description is based on the first codebook representing long term wideband channel characteristics, the present invention can be applied to the second codebook representing short term subband channel characteristics and a single codebook of LTE, which is not a hierarchical codebook.

Figure 13:
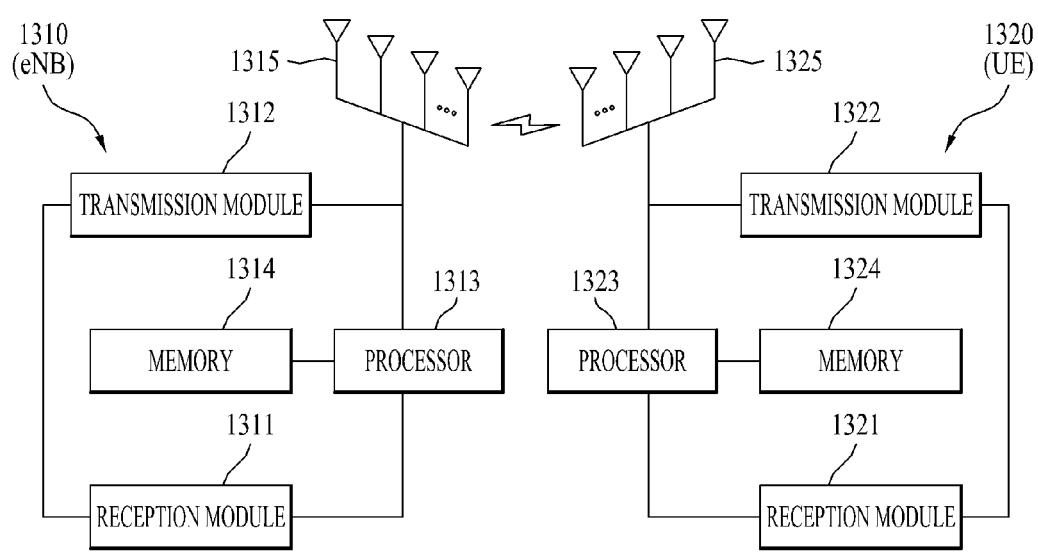
FIG. 13 illustrates a configuration of a transceiver according to an embodiment of the present invention.

FIG. 13 illustrates configurations of an eNB 1310 and a UE 1320 according to an embodiment of the present invention.

Referring to FIG. 13, the eNB 1310 according to an embodiment of the present invention may include a reception module 1311, a transmission module 1312, a processor 1313, a memory 1314 and a plurality of antennas 1315. The plurality of antennas 1315 represents that the eNB 1310 supports MIMO transmission and reception. The reception module 1311 may receive various signals, data and information on uplink from the UE. The transmission module 1312 may transmit various signals, data and information on downlink to the UE. The processor 1313 may control overall operation of the eNB 1310.

The processor 1313 of the eNB 1310 according to an embodiment of the present invention can determine a precoding matrix by selecting the first precoding matrix and the second precoding matrix and perform precoding on a downlink signal using the determined precoding matrix. The first precoding matrix may be a precoding matrix to which a revision factor representing the relationship between the UE receiving the downlink signal and the eNB (transmission point) has been applied.

The processor 1313 of the eNB 1310 may execute a function of processing information received by the eNB 1310 and information to be transmitted by the eNB 1310 and the memory 1314 may store the processed information for a predetermined time and may be replaced by a component such as a buffer (not shown).

Referring to FIG. 13, the UE 1320 according to an embodiment of the present invention may include a reception module 1321, a transmission module 1322, a processor 1323, a memory 1324 and a plurality of antennas 1325. The plurality of antennas 1325 represents that the UE supports MIMO transmission and reception. The reception module 1321 may receive various signals, data and information on downlink from the eNB. The transmission module 1322 may transmit various signals, data and information on uplink to the eNB. The processor 1323 may control overall operation of the UE 1320.

The processor 1323 of the UE 1320 according to an embodiment of the present invention can determine a precoding matrix by selecting the first precoding matrix and the second precoding matrix and transmit CSI including the index of the first precoding matrix and the index of the second precoding matrix. The first precoding matrix may be a precoding matrix to which a revision factor representing the relationship between the UE and the eNB (transmission point) has been applied.

The processor 1323 of the UE 1320 may execute a function of processing information received by the UE 1320 and information to be transmitted by the UE 1320 and the memory 1324 may store the processed information for a predetermined time and may be replaced by a component such as a buffer (not shown).

The eNB and the UE may be implemented such that the above-described embodiments of the invention can be independently applied thereto or two or more of the embodiments can be simultaneously applied thereto and descriptions of redundant parts are omitted for clarity.

Description of the transceiver 1310 shown in FIG. 10 may be equally applied to a relay as a downlink transmitter or an uplink receiver and description of the UE 1320 may be equally applied to a relay as a downlink receiver or an uplink transmitter.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

[INDUSTRIAL APPLICABILITY]

The above-described embodiments of the present invention can be applied to various mobile communication systems.

The invention claimed is:

1. A method for transmitting channel state information (CSI) at a user equipment (UE) served by two or more transmission points (TPs) in a wireless communication system, the method comprising:
  determining a precoding matrix by selecting a first precoding matrix having a revision factor for revising a difference between channel states of the two or more TPs and a second precoding matrix; and
  transmitting the CSI including an index of the first precoding matrix and an index of the second precoding matrix.

2. The method according to claim 1, wherein the first precoding matrix is selected from a first codebook reflecting long term wideband channel characteristics and the second precoding matrix is selected from a second codebook reflecting short term subband channel characteristics.

3. The method according to claim 2, wherein an i-th first precoding matrix W1(i) selected from the first codebook and a j-th second precoding matrix W2(j) selected from the second codebook are defined by $$W1(i) = \begin{bmatrix} X_i & 0 \\ 0 & \rho X_i \end{bmatrix}, \text{ and}$$

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix},$$

and
  wherein W1(i) is an Nt×2M matrix, $X_i$ is an (Nt/2)×M matrix, Nt is the number of transmission antennas of two or more TPs, $\rho$ is the revision factor, W2(j) is a 2M×r matrix, r is the number of layers, $e_M^p$ (p=k, l, ..., n) is an M×1 vector in which a p-th element is 1 and other elements are 0, $\alpha_j$, $\beta_j$ and $\gamma_j$ are phase values, $1 \leq k, l, n \leq M$, and k, l and n are integers.

4. The method according to claim 1, wherein the two or more TPs have a same cell ID.

5. The method according to claim 1, wherein the revision factor is UE-specific.

6. A method for transmitting a downlink signal at a transmission point (TP) in a wireless communication system, the method comprising:
  determining a precoding matrix by selecting a first precoding matrix havig a revision factor for revising a difference between a channel state of the TP and a channel state of another TP performing cooperative transmission with the TP for a user equipment (UE) and a second precoding matrix; and
  precoding a downlink signal using the precoding matrix.

7. The method according to claim 6, wherein the first precoding matrix is selected from a first codebook reflecting long term wideband channel characteristics and the second precoding matrix is selected from a second codebook reflecting short term subband channel characteristics.

8. The method according to claim 7, wherein an i-th first precoding matrix W1(i) selected from the first codebook and a j-th second precoding matrix W2(j) selected from the second codebook are defined by $$W1(i) = \begin{bmatrix} X_i & 0 \\ 0 & \rho X_i \end{bmatrix}, \text{ and}$$

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix},$$

wherein W1(i) is an Nt×2M matrix, $X_i$ is an (Nt/2)×M matrix, Nt is the number of transmission antennas of the TP, $\rho$ is the revision factor, W2(j) is a 2M×r matrix, r is the number of layers, $e_M^p$ (p=k, l, ..., n) is an M×1 vector in which a p-th element is 1 and other elements are 0, $\alpha_j$, $\beta_j$ and $\gamma_j$ are phase values, $1 \leq k, l, n \leq M$, and k, l and n are integers.

9. The method according to claim 6, wherein the TP and the another TP have a same cell ID.

10. The method according to claim 6, wherein the revision factor is UE-specific.

11. A user equipment (UE) served by two or more transmission points (TPs) in a wireless communication system, the UE comprising:
- a reception module; and
- a processor,
- wherein the processor is configured to:
    - determine a precoding matrix by selecting a first precoding matrix having a revision factor for revising a difference between channel states of the two or more TPs and a second precoding matrix, and
    - transmit channel state information (CSI) including an index of the first precoding matrix and an index of the second precoding matrix.

12. A transmission point (TP) in a wireless communication system, the TP comprising:
- a transmission module; and
- a processor,
- wherein the processor is configured to:
    - determine a precoding matrix by selecting a first precoding matrix having a revision factor for revising a difference between a channel state of the TP and a channel state of another TP performing cooperative transmission with the TP for a user equipment (UE) and a second precoding matrix, and
    - precode a downlink signal using the precoding matrix.

* * * * *